(12) United States Patent
Wakai et al.

(10) Patent No.: US 6,361,856 B1
(45) Date of Patent: Mar. 26, 2002

(54) EASILY TEARABLE FILM

(75) Inventors: Mutsumi Wakai; Hiroyuki Furukawa, both of Moriyama; Kiyoshi Oguchi; Isao Inoue, both of Tokyo, all of (JP)

(73) Assignees: Gunze Limited, Kyoto; Dai Nippon Printing Co., Ltd., Tokyo, both of (JP)

( * ) Notice: Subject to any disclaimer, the term of this patent is extended or adjusted under 35 U.S.C. 154(b) by 0 days.

(21) Appl. No.: 09/519,470

(22) Filed: Mar. 6, 2000

Related U.S. Application Data

(63) Continuation of application No. 08/894,785, filed as application No. PCT/JP96/03812 on Dec. 26, 1996, now abandoned.

(30) Foreign Application Priority Data

Dec. 28, 1995 (JP) .............................. 7-344228

(51) Int. Cl.[7] .................. B32B 27/08; B32B 27/30; B32B 27/32; B32B 27/36
(52) U.S. Cl. ............... 428/220; 428/480; 428/483; 428/515; 428/516; 428/523; 428/910
(58) Field of Search ............... 428/480, 483, 428/516, 220, 515, 523, 166, 910; 206/531, 532

(56) References Cited

U.S. PATENT DOCUMENTS

| | | | |
|---|---|---|---|
| 4,046,837 A | | 9/1977 | Carroll, Jr. ............... 260/873 |
| 5,139,878 A | * | 8/1992 | Kim et al. ................ 428/421 |
| 5,560,490 A | * | 10/1996 | Chawla .................... 206/539 |
| 5,612,104 A | * | 3/1997 | Grund ....................... 428/348 |
| 5,858,490 A | * | 1/1999 | Mori et al. ............... 428/36.7 |

FOREIGN PATENT DOCUMENTS

| | | |
|---|---|---|
| EP | 0 104 130 | 3/1984 |
| EP | 0 291 065 A3 | 11/1988 |
| EP | 0 613 832 A1 | 9/1994 |
| EP | 0644226 A1 * | 3/1995 |
| EP | 0 656 389 A1 | 6/1995 |
| JP | 62-222831 A * | 9/1987 |

OTHER PUBLICATIONS

Patent Abstracts of Japan; Publication No. 07–299857, Publication Date: Nov. 14, 1995.

* cited by examiner

*Primary Examiner*—Paul Thibodeau
*Assistant Examiner*—Ramsey Zacharia
(74) *Attorney, Agent, or Firm*—Kubovcik & Kubovcik

(57) ABSTRACT

The invention provides an easily tearable film comprising a composition consisting of about 97–60% by weight of polyester and about 3–40% by weight of polyolefin as an essential component.

3 Claims, 1 Drawing Sheet

EASILY TEARABLE FILM

This application is a continuation of application Ser. No. 08/894,785, filed Nov. 28, 1997, now abandoned, which is a national stage application under 35 U.S.C. §371 of PCT/JP96/03812 filed Dec. 26, 1996.

FIELD OF THE INVENTION

The invention relates to an easily tearable film which may be suitably used as cover material of a press through pack (hereinafter referred to as "PTP") and a blister pack in the field of pharmaceuticals and foods.

BACKGROUND ART

Aluminum foil (hereinafter referred to as "Al foil") which is excellent in easy-tear properties, gas barrier properties and resistance to vapor permeability is conventionally used as cover material of a PTP and a blister pack in the field of pharmaceuticals and foods.

Blister sheets prepared by vacuum forming of a monolayer sheet or a multilayer laminated sheet made of plastics, such as polyvinyl chloride (PVC), polypropylene (PP), polyvinylidene chloride (PVDC), polyester (PET), cyclic olefin copolymer (COC) and polyethylene (PE) are used as base material.

However, Al foil as cover material tends to remain without incineration thereof when thermal disposal of a used PTP on which Al foil is adhered as waste product is conducted. Incineration of Al foil until ashing requires considerably high temperature. Incineration at such a high temperature damages an incinerator leading to a short lifetime thereof. Fractional recovery of Al foil separated from base material requires a great amount of manpower and is substantially impossible.

In addition, wastes comprising packaging containers for drugs such as a PTP from medical institutions (hospital, etc.) have a problem of environmental pollution so that hospitals are requested to dispose of the wastes by themselves or to entrust the wastes to waste-disposal companies.

Thus, cover material of a PTP and a blister pack is requested to be made of materials capable of incineration in the same condition of temperature at which an incinerator is not damaged as base material of a PTP and a blister pack.

Under such circumstances, a variety of plastics and papers are now used as cover material of a PTP and a blister pack for pharmaceuticals and foods in place of Al foil. For example, cover material consisting of plastic film whose easy-tear property is imparted by adding a great amount of mineral filler to a plastic resin so as to reduce film strength thereof, or cover material consisting of plastic film whose easy-tear property is imparted by utilizing orientation of the film caused by stretching the film in at least one direction with a high stretch ratio is used. Alternatively, cover material made of papers such as glassine paper is partially used.

Cover material blended with a great amount of the filler has, however, a problem that mineral filler is scattered when the cover is torn for unsealing, leading to contamination of drugs or adhesion of the filler to foods. The cover material consisting of the above-mentioned film whose easy-tear property is imparted by utilizing orientation of the stretched film has a drawback that a directional property of the film makes it difficult to take out some packaged products. Furthermore, the cover material made of glassine paper is remarkably poor in resistance to water vapor permeability.

The present invention is conducted under such circumstances. It is an object of the invention to provide an easily tearable film which is comparable to Al foil in an easy-tear property and excellent in gas barrier property and resistance to water vapor permeability with no possibility of damaging an incinerator during thermal disposal. It is another object of the invention to provide an easily tearable film which is suitable as a cover material of a PTP, a blister pack, etc.

DISCLOSURE OF THE INVENTION

Figure 1:
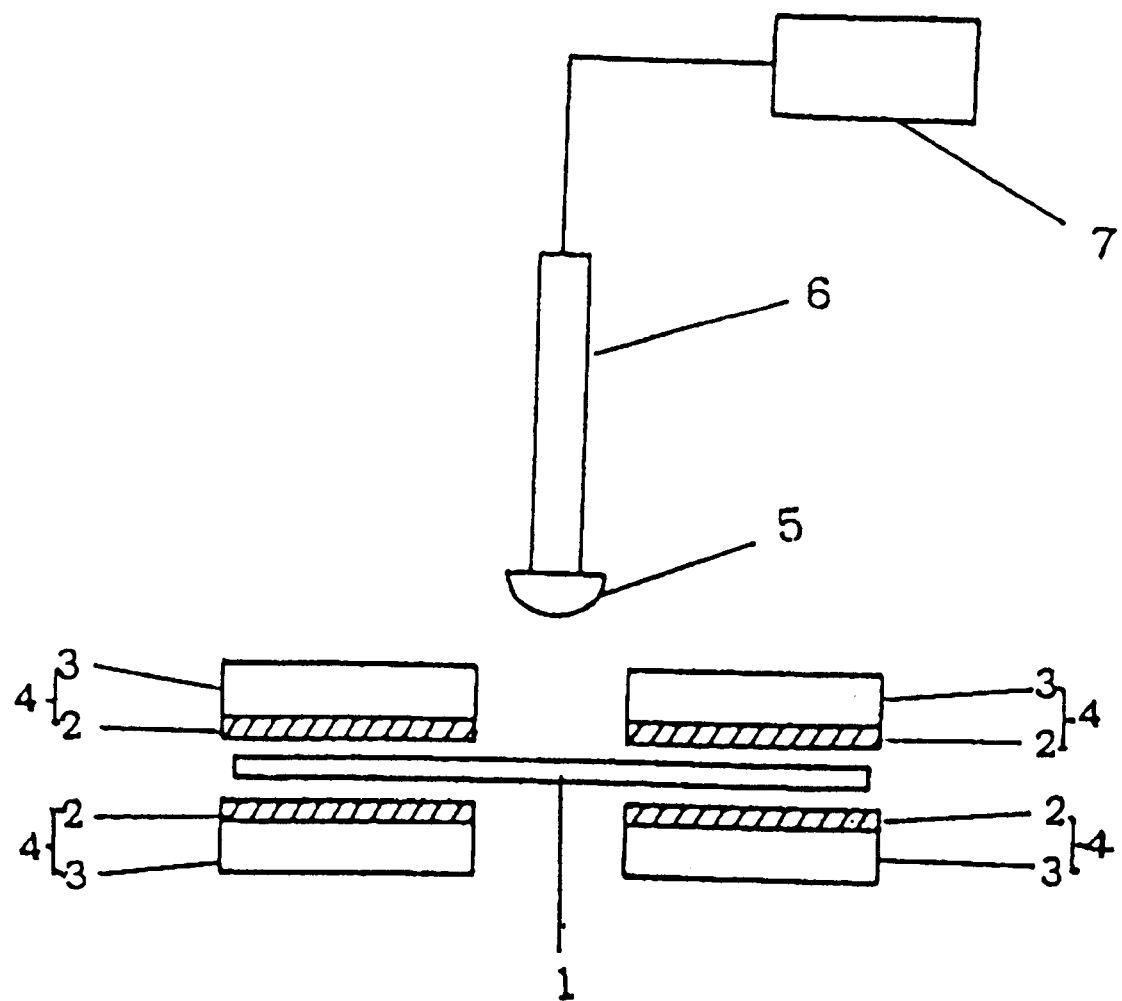
FIG. 1 demonstrates a schematic sectional view of a GUNZE-type tear strength measuring apparatus.

The feature of the invention is to provide an easily tearable mono- or multi-layer film comprising a composition consisting of about 97–60% by weight of polyester and about 3–40% by weight of polyolefin as an essential component.

The easily tearable film may consist of a composition consisting of about 97–60% by weight of polyester and about 3–40% by weight of polyolefin, or other components may be further blended therewith as long as the other components do not adversely affect an easy-tear property thereof. A mixing ratio of the composition in said easily tearable film is generally at least about 10% by weight, preferably at least about 50% by weight, more preferably at least about 70% by weight, in particular preferably at least about 90% by weight.

The polyester according to the invention includes polyesters prepared by condensation polymerization of an acid component containing a dicarboxylic acid moiety and a diol component.

The dicarboxylic acid component includes aliphatic dicarboxylic acids, aromatic dicarboxylic acids, alicyclic dicarboxylic acids or a mixture of two or more. Specifically, aliphatic dicarboxylic acids include adipic acid, sebacic acid, dodecanedicarboxylic acid and derivatives thereof (e.g. 3-methyl adipate). Aromatic dicarboxylic acids include terephthalic acid, isophthalic acid, naphthalene dicarboxylic acid and derivatives thereof (eg. 2,5-dimethylterephthalate, 4-methylterephthalate). Alicyclic dicarboxylic acids include cyclohexanedicarboxylic acid and derivatives thereof (eg. 1,1-cyclohexanediacetic acid).

The diol component include an aliphatic glycol, an alicyclic glycol or a mixture thereof. Specifically, aliphatic glycols include ethylene glycol, 1,3-propanediol, 1,4-butanediol, 1,6-hexanediol, 1,10-decanediol, trimethylene glycol, tetramethylene glycol, diethylene glycol and hexamethylene glycol, etc. Alicyclic glycols include 1,4-cyclohexanediol, etc.

Intrinsic viscosity ($\eta$) of the polyester of the invention is in the range of about 0.2–1.0 dl/g, preferably about 0.30–0.47 dl/g, more preferably about 0.35–0.45 dl/g. When the intrinsic viscosity ($\eta$) is about 0.20 dl/g or less, film formation is difficult due to fragility thereof. When the intrinsic viscosity ($\eta$) is more than about 1.0 dl/g, an easy-tear property thereof is reduced causing a tendency that taking out of packaged products becomes difficult.

Polyolefins used in (A) layer and (C) layer of the invention are not specifically limited, but include a homopolymer or copolymer of an $\alpha$-olefin selected from ethylene, propylene, 1-butene, 1-pentene, 1-hexene, 1-octene and 4-methyl-1-pentene or a copolymer of said $\alpha$-olefin and a monomer capable of copolymerization with $\alpha$-olefin, for example, at least one polymer selected from a copolymer of $\alpha$-olefin and other vinyl-group containing monomer or monomers and a copolymer of α-olefin and cyclic olefin or olefins or a mixture thereof.

Specifically low density polyethylene, medium density polyethylene and high density polyethylene, linear low density polyethylene (LLDPE), very low density polyethylene (VLDPE), polypropylene, poly-1-butene, poly-1-hexene, poly-1-pentene, poly-1-heptene, poly-1-octene, poly-4-methyl-1-pentene, ethylene-propylene copolymer, ethylene-1-butene copolymer, propylene-1-butene copolymer, ethylene-ethylacrylate copolymer (EEA), ethylene-vinylacetate copolymer (EVA), ethylene-acrylic acid copolymer (EAA), at least one polymer selected from copolymers of at least one of ethylene, propylene and butene, and at least one selected from bicyclo [2,2,1] heptodiene derivatives, tetracyclo-3-dodecene derivatives, hexacyclo-4-heptadecene derivatives, octacyclo-5-docosene derivatives, pentacyclo-4-hexadecene derivatives, pentacyclo-3-pentadecene derivatives, heptacyclo-4-icosene derivatives, nonacyclo-5-pentadocosene derivatives and norbornene derivatives, and a mixture of two or more of said polyolefins are exemplified.

Polystyrenes used in (C) layer of the invention are not specifically limited, but include homopolymers of monomers having styrene structure, or two-component or three-component copolymers having styrene as a main component, polymers of styrene derivatives and a mixture thereof.

Specifically, homopolystyrene and like homopolymers of monomers having styrene structure, styrene-butadiene copolymer, styrene-acrylonitrile copolymer, styrene-acrylonitrile-butadiene three-component copolymer, polymethylstyrene, poly-α-methylstyrene, polydichlorostyrene and a mixture of two or more are exemplified.

When polyolefin is used in (C) layer, polyolefins used in (A) layer and (C) layer are not specifically limited and may be the same or different.

With respect to polyolefins, polyolefins blended with polyesters in (A) layer are preferably poly-4-methyl-1-pentene and like polymers with a tendency that no void caused by interfacial peeling is generated during biaxial orientation.

When poly-4-methyl-1-pentene and like polymers are used as polyolefin, poly-4-methyl-1-pentene and like polymers include a homopolymer of 4-methyl-1-pentene, and copolymers of 4-methyl-1-pentene and other α-olefins having 2–20 carbon atoms such as ethylene, propylene, 1-butene, 1-hexene, 1-decene, 1-tetradecene, 1-octadecene, preferably copolymers containing 85 mole % or more of 4-methyl-1-pentene.

The poly-4-methyl-1-pentene and like polymers are not specifically limited, but include polymers having a melt flow rate (MFR, loading: 5 kg, temperature: 260° C.) of about 0.5–200 g/10 min. When MFR is less than about 0.5 g/10 min, melting viscosity thereof increases leading to a tendency that a mixture with polyesters is very heterogeneous. When MFR is more than about 200 g/10 min, melting viscosity thereof decreases leading to a tendency of deterioration of processability and mechanical strength thereof.

A composition of (A) layer of the easily tearable monolayer film or laminate film having at least two layers of the invention comprises about 97–60% by weight of polyester and about 3–40% by weight of polyolefin as an essential component.

In case that polyester is more than about 97% by weight, and that polyolefin is less than about 3% by weight, interface between polyester region and polyolefin region is reduced leading to improved strength and decreased easy-tear property of the film. In case that polyester is less than about 60% by weight, and that polyolefin is more than about 40% by weight, interface between polyester region and polyolefin region is increased leading to easy breaking of the film due to excessive improvement of the easy-tear property thereof, and is unsuitable.

Polyesters include polyethylene-2,6-naphthalate (PEN) consisting of naphthalene-2,6-dicarboxylic acid and ethyleneglycol as a polymer with a tendency of an excellent easy-tear property because of hardness and fragility thereof.

Said polyethylene-2,6-naphthalate may have an intrinsic viscosity (η) of 0.35–0.45 dl/g. A preferable mixing ratio is about 90–80% by weight of polyester and about 10–20% by weight of polyolefin, but is not specifically limited.

A thickness of an easily tearable mono-layer film comprising an (A) layer comprising a composition of the polyethylene-2,6-naphthalate and polyolefin as an essential component preferably ranges about 10–50 μm. In case of two-component film such as (A) layer/(B) layer, about 10–50 μm is a preferable thickness thereof. In case of three-component film such as (A)layer/(B)layer/(A)layer or (A)layer/(B)layer/(C)layer, about 15–70 μm is a preferable thickness thereof. In case of five-component film such as (A)layer/(B)layer/(C)layer/(B)layer/(A)layer, about 25–100 μm is a preferable thickness thereof.

When the easily tearable film of the invention is a laminate film, adhesive resins of (B) layer typically include modified polymers prepared by graft copolymerization and like copolymerization of polyolefins used in (A) layer and (C) layer using maleic acid, acrylic acid, methacrylic acid, fumaric acid, itaconic acid and like unsaturated carboxylic acid and/or esters acid anhydrides, metal salts and derivatives thereof. Other adhesive resins are not specifically limited, but include a mixture of the modified polymer and another component such as polyolefin resin, ionomer resin, ethylene-ethylacrylate resin (EEA), ethylene-vinylalcohol copolymer and saponified ethylene-vinylacetate copolymer. When (B) layer is placed on the outer surface, adhesive resins having resistance to blocking are preferable.

A method for preparing the composition, which is an essential component of (A) layer of the invention, comprising polyester and polyolefin is not specifically limited, and may be carried out according to a conventional method for preparing a polypropylene-containing composition.

Specifically, a blend method using a ribbon blender, Henschel mixer, tambling mixer, etc., a kneading method using a kneader, Banbury mixer, roll, etc., a method comprising strand-like extrusion with a uniaxial or biaxial extruder and T-die, cutting in a suitable length to form a pellet, and cooling the pellet are exemplified, but are not specifically limited.

A variety of additives, fillers and thermoplastic resins may be added to the (A) layer, (B) layer and (C) layer of the invention. The additives include heat stabilizers, antioxidants, light stabilizer, antistatic agents, lubricants and nucleating agents. The fillers include calcium carbonate, barium sulfate, magnesium hydroxide, talc and mica. The thermoplastic resins include ionomers and thermoplastic elastmers. The additives, fillers and thermoplastic resins are not specifically limited to those described above. It is safe not to blend additives, fillers and thermoplastic resins.

Preferable embodiments of easily tearable film of the invention include a mono-layer film comprising a composition of polyester blended with polyolefin as an essential component, an (A)layer/(B)layer laminate film having at least two layers of (A) layer comprising a composition of polyester blended with polyolefin as an essential component and (B) layer comprising adhesive resin as an essential component, an (A)layer/(B)layer/(A)layer laminate film comprising (A) layer as a skin layer and (B) layer as a core layer, an (A)layer/(B)layer/(C)layer laminate film having at least three layers wherein (A) layer comprising a composition of polyester blended with polyolefin as an essential component and (C) layer comprising polyester and/or polyolefin as an essential component are intervened.with (B) layer comprising an adhesive resin as an essential component, and an (A)layer/(B)layer/(C)layer/(B)layer/(A) layer laminate film having at least five layers comprising (A) layers as a skin layer and (C) layer as a core layer, which is symmetrically laminated taking (C) layer as a center.

The easily tearable film of the invention also includes (A)layer/(B)layer/(A)layer/(B)layer/(C)layer and (A)layer/(B)layer/(C)layer/(B)layer/(C)layer.

In addition, (A)layer/(B)layer/(A')layer and (A)layer/(B)layer/(A')layer/(B)layer/(C)layer film laminates are included wherein (A') layer has a different mixing ratio of polyester and polyolefin from (A) layer.

With respect to the easily tearable film of the invention, the (A) layer contributes to imparting of an easy-tear property to the film, but tends to be easily torn during fabrication so that caution is needed. In contrast, with respect to a laminate film having (C) layer, (C) layer is inferior in an easily tearable property, but superior in form stability and resistance to water vapor transmission, and (B) layer improves laminate strength between layers leading to expansion of application thereof.

With respect to the easily tearable laminate film, (A)layer/(B)layer/(C)layer and (A)layer/(B)layer/(C)layer/(B)layer/(A)layer in which (A) layer is a skin layer, (C) layer is a core layer, and symmetrical lamination is carried out using (C) layer as a center in a thickness direction are excellent in easy-tear property, form stability, resistance to vapor transmission and curling resistance, and is preferable.

The easily tearable film of the invention may be preferably used as cover material of a PTP and a blister pack in the field of pharmaceuticals and foods but is not specifically limited. The easily tearable film may be applied to any application other than a cover material.

Furthermore, with respect to the easily tearable film of the invention, a suitable layer comprising one or more resins may be laminated on the surface of the (A) layer and/or (B) layer or between (A) layer and (B) layer when necessary, as long as the layer does not inhibit an easy-tear property of the film. When the laminate film has a (C) layer, a suitable layer comprising one or more resin may be laminated on the surface of the (A) layer and/or (C) layer or between (A) layer and the (B) layer and/or between (B) layer and (C) layer, when necessary. The resin in the suitable layer is not specificaly limited and may be the same as or different from any resin or polymer of the (A) layer, (B) layer and (C) layer.

Furthermore, the resin may be a composition having different mixing ratio of polymers of (A) layer, a mixture of at least two polymers used in said layers or a mixture of any one polymer used in said layers and a foreign polymer (resin) not used in said layers. The resin is not specifically limited. In this case, said foreign polymer (resin) preferably includes ethylene-vinylalcohol copolymer, polyvinylidenechloride resin and ethylene-vinylacetate copolymer, but is not specifically limited as long as the resin does not inhibit the easy-tear property and other characteristic properties thereof.

Furthermore, with respect to the easily tearable film of the invention, a printing layer may be formed on the surface of the (A) layer and/or (B) layer and/or (C) layer, when necessary. A deposit layer comprising $SiO_x$, $Al_2O_3$, $MgO$, $Al$ and like an inorganic compound may be formed on the surface of at least one of (A) layer, (B) layer and (C) layer, when resistance to vapor transmission and an oxygen barrier property is especially needed.

Furthermore, when necessary for use as a cover material, heat-sealing material comprising at least one selected from the group consisting of vinylacetate resin, vinylchloride-vinylacetate copolymer, vinylchloride resin, acrylic resin, polyester resin, ethylene-vinylacetate copolymer(EVA), polyvinylalcohol resin (PVA), polyolefin resin, modified polyolefin resin, urethane resin, urethane-modified polyester resin, partially urethane-modified polyester resin, polyether resin and modified ether-type polyester resin, and a pressure-sensitive adhesive comprising at least one selected from the group consisting of chloroprene, polyisobutylene, polyisoprene, polyacrylate ester, polyvinylether, styrene-butadiene rubber and butyl rubber may be laminated on the surface of at least one of the (A) layer, (B) layer and (C) layer. Said heat-sealing material and pressure-sensitive adhesive may be used together with isocyanates and like curing agents. Said heat-sealing material and pressure-sensitive adhesive are not specifically limited and other than above-exemplified materials may be used and may be selected according to base material.

Types of heat-sealing material and pressure-sensitive adhesive are not specifically limited. Aqueous-type, organic solvent-type, hot-melt type, emulsion-type heat-sealing material and pressure-sensitive adhesive may be used. Lamination may be carried out according to suitable processes such as co-extrusion, extrusion laminating, dry laminating, gravure coating and roll coating, and is not specifically limited.

When the easily tearable film of the invention is a laminate film comprising at least an (A) layer, (B) layer and (C) layer, methods for laminating the layers are not specifically limited and include a co-extrusion method performed by co-extruding layers for lamination to obtain, for example, (A)layer/(B)layer/(C)layer; an extrusion laminating method performed by extrusion and film-formation of (B) layer on (A) layer or (C) layer, or by extrusion and film-formation of (C) layer or (A) layer on (B) layer to obtain, for example, (A)layer/(B)layer/(C)layer; a dry laminating method performed by laminating (A) layer, (B) layer and (C) layer using adhesives therebetween to obtain (A)layer/(B)layer/(C)layer; a thermo compression bonding method performed by laminating (A) layer, (B) layer and (C) layer, followed by thermo-compression of the layers to obtain (A)layer/(B)layer/(C)layer.

When the easily tearable film of the invention is a laminate film comprising at least (A) layer and (B) layer, methods for laminating the layers are not specifically limited and include co-extrusion, extrusion laminating, dry laminating and thermo compression bonding performed as shown above.

The easily tearable film of the invention may be surface-treated to improve printability and ease of lamination.

The methods for surface treatment of the film are not specifically limited and include corona discharge treatment, plasma treatment, flame treatment and acid treatment. According to the invention, any method may be used and the method is not specifically limited. However, a corona discharge treatment is most preferable because of ease of performance before a rolling step for producing the easily tearable film and handleability.

A method for producing the easily tearable film of the invention is preferably performed by co-extrusion with a T-die because of capability of melt-lamination, but is not specifically limited.

Stated more specifically, a pellet comprising a composition forming (A) layer consisting of polyester and polyolefin as an essential component is dried with a known dryer under suitable drying conditions until water content thereof is up to about 100 ppm, preferably up to about 50 ppm.

A monolayer film comprising (A) layer may be formed by a conventional T-die method using said pellet.

With respect to a laminate film comprising (C) layer, the dried pellet comprising a composition consisting of polyester and polyolefin as an essential component, polyolefin and/or polyester forming (C) layer and an adhesive resin forming (B) layer are introduced into hoppers of at least three independent extruders linked with T-die for co-extrusion, respectively. The introduced resins (preferably pellet) are melt-extruded by an extruder heated at 270–310° C., and then cooled and solidified in water or air, or with a cooling roll to form the easily tearable laminate film, for example, (A)layer/(B)layer/(C)layer structure, but are not specifically limited. With respect to another embodiment, the easily tearable laminate film having five layers such as (A)layer/(B)layer/(C)layer/(B)layer/(A)layer; (A)layer/(B)layer/(A)layer/(B)layer/(C)layer; and (A)layer/(B)layer/(C)layer/(B)layer/(C)layer may be prepared in the same manner as above using five independent extruders.

Furthermore, the films having a (A)layer/(B)layer structure or (A)layer/(B)layer/(A)layer three-layer structure may be formed in the same manner as above.

The easily tearable mono-layer and laminate film of the invention may be unstretched or optionally stretched.

A method of stretching the film is not specifically limited and includes a sequential biaxial orientation after melt-extrusion for film-formation, a uniaxial orientation and a simultaneous biaxial orientation. Stretching may be carried out in separate processes.

Stretching conditions are not specifically limited. With respect to stretching in a longitudinal direction, stretching conditions include about 80–140° C. of a surface temperature of a heat roll and a stretch ratio of about 1.5–3.5 determined by a rotation speed ratio of a heated slow-driving roll (front) and heated quick-driving roll (back). With respect to stretching in a lateral direction, stretching may be carried out at about 90–160° C. of an atmospheric temperature in a tenter and a stretch ratio of about 3.0–5.0 using a tenter wherein both ends of film are fixed with clips. Stretching may also be carried out by forming a tube-like film with a ring die, followed by uniaxial or biaxial stretching of the film by a tube stretching method.

Furthermore, the easily tearable film of the invention may be optionally heat-set after stretching. A method for heat-setting the film is not specifically limited, but comprises heat-setting a laterally-stretched film for about 1.0–20 seconds in a rear room of a tenter at a temperature higher than a stretching temperature with relaxing the film as much as about a few % (0.5–2.0%) in a width direction.

With respect to the easily tearable film of the invention, film thickness is not specifically limited, but ranges about 10–50 $\mu$m in case of a mono-layer film comprising a composition of polyesters and polyamides as an essential component. A thickness of less than 10 $\mu$m tends to decrease resistance to vapor permeability. A thickness of more than 50 $\mu$m tends to decrease an easy-tear property thereof.

In case of a two-layer film comprising an (A) layer and a (B) layer essentially comprising an adhesive resin, a film thickness is about 10–50 $\mu$m, a thickness of (A) layer is about 5–25 $\mu$m and a thickness of (B) layer is about 5–25 $\mu$m, but the thicknesses are not specifically limited. Less than 5 $\mu$m of a thickness of (A) layer tends to tear during film formation. More than 25 $\mu$m of a thickness of (A) layer tends to decrease an easy tear property.

Furthermore, in case of films comprising (A) layer and (B) layer, such as (A)layer/(B)layer/(A)layer, and films comprising (A) layer, (B) layer and (C) layer comprising polyolefin and/or polystyrene as an essential component having three layers such as (A)layer/(B)layer/(C)layer, or five layers such as (A)layer/(B)layer/(C)layer/(B)layer/(A) layer, about 5–25 $\mu$m of a thickness of (A) layer is exemplified, but is not specifically limited. Less than 5 $\mu$m of a thickness of (A) layer tend to tear during film formation. More than 25 $\mu$m of a thickness of (A) layer tend to decrease an easy-tear property. A thickness of (B) layer is not specifically limited as long as (B) layer is capable of bonding (A) layer to (A) layer or (C) layer, but ranges about 5 $\mu$m or less. A thickness of (C) layer is not specifically limited, but ranges about 5–40 $\mu$m. Less than about 5 $\mu$m of the thickness thereof tends to tear during rolling of a stretched film. More than 40 $\mu$m of the thickness thereof tends to decrease an easy-tear property. A thickness of film is not specifically limited, but ranges about 15–70 $\mu$m with respect to three-layer film and about 25–115 $\mu$m with respect to five-layer film.

BEST MODE FOR CARRYING OUT THE INVENTION

The invention will be described below in detail using examples, but the invention is in no way limited to the examples.

Examination items with respect to the examples are determined according to the following methods.

{Intrinsic viscosity ($\eta$)}: Polyester is dissolved in a mixed solvent of phenol and 1,1,2,2-tetrachloroethane (weight ratio=6:4) at 100° C. for 1 hour in a concentration of 0.2–1.0 g/dl. A viscosity of the solvent is determined using an Ubbellohde viscometer at 35° C. An intrinsic viscosity is determined by extrapolation of the viscosity of the solution toward 0 g/dl.

{Tensile strength at break}: Determination is carried out according to JIS K-7127.

{Tensile elongation at break}: Determination is carried out according to JIS K-7127.

{Easy-tear property}: Shown as a tear propagation strength. The tear propagation strength is determined with a Gunze-type measuring device.

As shown in FIG. 1, the Gunze-type measuring device comprises fixing members (4), (4), (4), (4) comprising a metal plate (2) and a rubber plate (3) to fix a laminate film (1), a probe (6) provided with a hemisphere (5) having a diameter of 8 mm which descends until the laminate film is torn and a detector (7) to determine a tear propagation strength of the laminate film (1).

{Water vapor transmission}: Determination is carried out according to JIS K-9129.

A tensile strength at break is preferably up to 10 kg/mm$^2$, more preferably 1.0–6.0 kg/mm$^2$;

A tensile elongation at break is preferably up to 50%, more preferably 1.0–40%;

A tear propagation strength is preferably up to 3.0 kg, more preferably 0.5–2.5 kg; and A water vapor transmission is preferably up to 20 g/m²/day.

EXAMPLE 1

A pellet was produced by melt-kneading at 300° C. for 10 minutes a composition comprising 90% by weight of polyethylene-2,6-naphthalate (PEN; intrinsic viscosity=0.4 dl/g) consisting of naphthalene-2,6-dicarboxylic acid and ethylene glycol and 10% by weight of poly-4-methyl-1-pentene (MFR=180 g/10 min, load: 5 kg, temperature: 260° C.) as a composition of a skin layer (A).

The resulting pellet (water content 50 ppm) was used in a skin layer (A), an adhesive resin which is a polyethylene resin modified by maleic acid was used in (B) layer, and a very low density polyethylene (VLDPE) having a density of 0.89 g/cm and a MFR (190° C.) of 1.0 g/10 min was used in a core layer (C).

With respect to five extruders independently linked with T-die for five-layer co-extrusion, the composition comprising the polyethylene-2,6-naphthalate (PEN) and the poly-4-methyl-1-pentene to be included in (A) layer was supplied to two extruders, the adhesive resin to be included in (B) layer (adhesive layer) was supplied to two other extruders, and the very low density polyethylene to be included in (C) layer (core layer) was supplied to the remaining one extruder, respectively. A laminate film, (A)/(B)/(C)/(B)/(A), was obtained by melt coextrusion thereof for lamination, followed by quenching the laminate film with a cooling roll.

Subsequently, using a stretching machine for sequential biaxial orientation, the laminate film was stretched with a preheat roll having a surface temperature of 135–145° C. at a stretch ratio of 1.8 in a longitudinal direction as a first step and then stretched with a tenter at an atmospheric temperature in a tenter of 150–160° C. at a stretch ratio of 4.2 in a lateral direction as a second step. The resulting film was then heat-set at 210° C. for 3–20 seconds with relaxing the film as much as about 2% in a width direction to obtain an easily tearable laminate film {(A)/(B)/(C)/(B)/(A)=8/2/10/2/8 μm} having a thickness of 30 μm.

The easily tearable laminate film was gravure-coated in whole area with a heat-sealing material consisting of a polyester resin at a rate of 8 g/m² to form a cover material. Base material was formed by vacuum-forming a sheet comprising a vinyl chloride resin having a thickness of 200 μm to a disc tablet (diameter about 10 mm, height 5 mm).

The base material was heat-sealed with said cover material at a seal temperature of 140° C., seal pressure of 4 kgf/cm² and seal time of 1 second to obtain a PTP. The PTP using the easily tearable laminate film had an easy-tear property comparable to Al foil.

Tensile strength at break, tensile elongation at break, tear propagation strength and water vapor transmission of the easily tearable laminate film are shown in table 1.

EXAMPLE 2

An easily tearable laminate film {(A)/(B)/(C)=12/2/16 μm} having a thickness of 30 μm was obtained in the same manner as example 1 except that independent three extruders and T-die linked therewith for three-layer co-extrusion were used for forming a three-layer film (A)/(B)/(C) wherein (A) layer, (B) layer and (C) layer were the same as example 1. Tensile strength at break, tensile elongation at break, tear propagation strength and water vapor transmission of the easily tearable laminate film are shown in table 1.

EXAMPLE 3

A PTP was obtained in the same manner as example 1 except that polypropylene-type copolymer (MFR=10 g/10 min, ASTM D-1238) was used in place of the poly-4-methyl-1-pentene of skin layer (A) and the very low density polyethylene of core layer (C) of example 1 and that polyethylene modified by maleic anhydride was used in an adhesive layer (B). The resulting PTP had a good easy-tear property. Tensile strength at break, tensile elongation at break, tear propagation strength and water vapor transmission of the easily tearable laminate film are shown in table 1.

EXAMPLE 4

A PTP was obtained in the same manner as example 1 except that a copolymer of ethylene and tetracyclo-3-dodecene (MFR=40 g/10 min, ASTM D-1238) was used in place of the poly-4-methyl-1-pentene used in a skin layer (A) and the very low density polyethylene used in a core layer (C) and that a polyethylene resin modified by maleic anhydride was used in an adhesive layer (B). The resulting PTP had a good easy-tear property. Tensile strength at break, tensile elongation at break, tear propagation strength and water vapor transmission of the easily tearable laminate film are shown in table 1.

EXAMPLE 5

A PTP was obtained in the same manner as example 1 except that the only skin layer (A) was melt-extruded to form a monolayer film having a thickness of 30 μm. The resulting PTP had a good easy-tear property. Tensile strength at break, tensile elongation at break, tear propagation strength and water vapor transmission of the easily tearable laminate film are shown in table 1.

EXAMPLE 6

A easily tearable laminate film ((A)/(B)/(A)=12/2/16=30 μm) was obtained in the same manner as example 2 except that (C) layer of example 2 was replaced by (A) layer. The resulting PTP had a good easy-tear property. Tensile strength at break, tear propagation strength and water vapor transmission of the easily tearable laminate film are shown in table 1.

EXAMPLE 7

A PTP was obtained in the same manner as example 1 except that a stretch ratio in a longitudinal direction and a stretch ratio in a lateral direction were 2, respectively. The resulting PTP had a good easy-tear property. Tensile strength at break, tensile elongation at break, tear propagation strength and water vapor transmission of the easily tearable laminate film are shown in table 1.

EXAMPLE 8

A PTP was obtained in the same manner as example 1 except that polystyrene (MFR determined according to ASTM D-1238=7 g/10 min) was used in place of the very low density polyethylene (VLDPE) of core layer (C) in example 1. The resulting PTP had a good easy-tear property. Tensile strength at break, tensile elongation at break, tear propagation strength and water vapor transmission of the easily tearable laminate film are shown in table 1.

EXAMPLE 9

A PTP was obtained in the same manner as example 1 except that a composition comprising 50% by weight of polystyrene (MFR determined according to ASTM D-1238=7 g/10 min) and 50% by weight of polypropylene (MFR determined according to ASTM D-1238=10 g/10 min) was used in place of the very low density polyethylene (VLDPE) of core layer (C) in example 1. The resulting PTP had a good easy-tear property. Tensile strength at break, tensile elongation at break, tear propagation strength and water vapor transmission of the easily tearable laminate film are shown in table 1.

Comparative Example 1

An easily tearable laminate film, (A)/(B)/(C)/(B)/(A), was obtained in the same manner as example 1 except that a skin layer (A) comprised polyethylene-2,6-naphthalate (PEN; intrinsic viscosity=0.4 dl/g) consisting of naphthalene-2,6-dicarboxylic acid and ethylene glycol, that (B) layer comprised an adhesive. resin which is a polyethylene resin modified by maleic acid, that a core layer (C) comprised a polypropylene having a density of 0.90 g/cm$^3$ and MFR (230° C.) of 1.0 g/10 min, that a stretch ratio in a longitudinal direction was 3.0, and that a stretch ratio in a lateral direction was 8.0. Tensile strength at break, tensile elongation at break, tear propagation strength and water vapor transmission of the easily tearable laminate film are shown in table 1.

Comparative Example 2

An easily tearable laminate film, (A)/(B)/(C)/(B)/(A), was obtained wherein a skin layer (A) comprised polyethylene-2,6-naphthalate (PEN; intrinsic viscosity=0.4 dl/g) consisting of naphthalene-2,6-dicarboxylic acid and ethylene glycol, (B) layer comprised an adhesive resin which is a polyethylene resin modified by maleic acid, a core layer (C) comprised a polypropylene having a density of 0.89 g/cm$^3$ and MFR (230° C.) of 3.0 g/10 min. Tensile strength at break, tensile elongation at break, tear propagation strength and water vapor transmission of the easily tearable laminate film are shown in table 1.

TABLE 1

|  | Tensile strength at break (kg/mm$^2$) | | Tensile elongation at break (%) | | Tear propagation strength | Water vapor transmission |
| --- | --- | --- | --- | --- | --- | --- |
|  | MD | TD | MD | TD | (kg) | (g/m$^2$/day) |
| Ex. 1 | 1.0 | 5.0 | 1.1 | 2.5 | 0.5 | 10.3 |
| Ex. 2 | 3.0 | 5.5 | 1.5 | 3.5 | 1.0 | 11.4 |
| Ex. 3 | 1.2 | 5.2 | 1.2 | 2.9 | 0.8 | 8.2 |
| Ex. 4 | 1.8 | 5.6 | 1.0 | 2.3 | 0.8 | 5.0 |
| Ex. 5 | 1.0 | 4.2 | 1.8 | 3.9 | 1.2 | 15.6 |
| Ex. 6 | 1.1 | 1.3 | 1.5 | 1.5 | 0.4 | 11.2 |
| Ex. 7 | 1.1 | 1.2 | 1.1 | 1.3 | 0.6 | 10.9 |
| Ex. 8 | 1.1 | 1.2 | 1.0 | 1.2 | 0.5 | 18.9 |
| Ex. 9 | 2.2 | 3.0 | 1.5 | 2.2 | 1.0 | 14.3 |
| Comp. Ex. 1 | 35.0 | 110.0 | 29.0 | 27.0 | 21.4 | 11.5 |
| Comp. Ex. 2 | 30.4 | 98.0 | 33.2 | 25.8 | 18.9 | 12.1 |

It is obvious from table 1 that the easily tearable films obtained in examples 1–9 have lower tensile strength at break and tensile elongation at break than those obtained in comparative examples 1 and 2 showing a lower and suitable tear propagation strength. The film of the invention obtained in examples 1–9 are, therefore, excellent in an easy-tear property.

The easily tearable film of the invention is very easily torn. When the film is used as cover material of a PTP for pharmaceuticals, the films exert an outstanding effect that tablets and the like are easily taken out and that deterioration of packaged products is inhibited due to low water vapor transmission. The film having low heat of combustion does not damage an incinerator during thermal disposal.

Furthermore, the easily tearable film of the invention is excellent in hygienic qualities, unlike conventional films to which easy-tear property is imparted by adding to the film a great amount of mineral filler which may be scattered when torn, and the scattered filler is mixed with or attached to packaged products such as pharmaceuticals.

What is claimed is:

1. A tearable film having a five layer structure of (A) layer/(B) layer/(C) layer/(B) layer/(A) layer and a thickness of about 25–100 μm, wherein each (A) layer comprises about 97–60% by weight of polyethylene-2,6-naphthalate having an intrinsic viscosity (η) of about 0.35–0.45 dl/g and about 3–40% by weight of at least one polyolefin selected from the group consisting of polypropylene and poly-4-methyl-1-pentene as an essential component, wherein each (B) layer comprises an adhesive resin as an essential component and wherein the (C) layer comprises polyolefin and/or polystyrene as an essential component.

2. The tearable film as defined in claim 1 wherein the polyolefin of the (C) layer is at least one selected from the group consisting of low density polyethylene, medium density polyethylene, high density polyethylene, linear low density polyethylene (LLDPE), very low density polyethylene (VLDPE), polypropylene, poly-1-butene, poly-1-hexene, poly-1-pentene, poly-1-octene, poly-4-methyl-1-pentene, ethylene-propylene copolymer, ethylene-1-butene copolymer, propylene-1-butene copolymer, ethylene-ethylacrylate copolymer (EEA), ethylene-vinylacetate copolymer (EVA), ethylene-acrylic acid copolymer (EAA), at least one copolymer of at least one of ethylene, propylene, and butene, and at least one monomer selected from a bicyclo [2,2,1] heptodiene, a tetracyclo-3-dodecene, a hexacyclo-4-heptadecene, an octacyclo-5-docosene, a pentacyclo-4-hexadecene, a pentacyclo-3-pentadecene, a heptacyclo-4-icosene, a nonacyclo-5-pentadocosene, and a norbornene.

3. A tearable film having a five layer structure of (A) layer/(B) layer/(C) layer/(B) layer/(A) layer and a thickness of about 25–100 μm, wherein each (A) layer comprises about 97–60% by weight of polyethylene-2,6-naphthalate having an intrinsic viscosity (η) of about 0.35–0.45 dl/g and about 3–40% by weight of poly-4-methyl-1-pentene as essential components, wherein each (B) layer comprises an adhesive resin as an essential component and wherein the (C) layer comprises polyolefin and/or polystyrene as an essential component.

* * * * *